United States Patent [19]

Shinn

[11] Patent Number: 4,791,971
[45] Date of Patent: Dec. 20, 1988

[54] PNEUMATIC TRACTOR TIRE

[75] Inventor: Betty J. Shinn, East Haven, Conn.

[73] Assignee: The Armstrong Rubber Co., New Haven, Conn.

[21] Appl. No.: 48,625

[22] Filed: May 11, 1987

[51] Int. Cl.$^4$ ............................................. B60C 11/03
[52] U.S. Cl. ................................................. 152/209 B
[58] Field of Search ............ 152/209 B, 209 R, 209 D

[56] References Cited

U.S. PATENT DOCUMENTS

| | | | |
|---|---|---|---|
| 4,186,788 | 2/1980 | Pommier | 152/209 B |
| 4,383,567 | 5/1983 | Crum et al. | 152/209 B |
| 4,446,902 | 5/1984 | Madec | 152/209 B |
| 4,611,647 | 9/1986 | Rimondi | 152/209 B |

*Primary Examiner*—Michael Ball
*Attorney, Agent, or Firm*—St. Onge Steward Johnston & Reens

[57] ABSTRACT

A pneumatic tire, particularly for tractors or other like vehicles, having a tread portion containing alternating, spaced-apart short and long lugs proceeding axially inward from a lateral tread edge, and an identical (but opposite in hand) set of long and short lugs proceeding axially inward from the other lateral tread edge and offset circumferentially so that a long lug emanating from one lateral edge is opposite a short lug emanating from the other lateral edge. The lugs are smoothly curved axially inward in the direction of intended tire rotation to provide excellent traction while minimizing vibration.

14 Claims, 3 Drawing Sheets

PNEUMATIC TRACTOR TIRE

BACKGROUND OF THE INVENTION

The present invention relates to pneumatic tires and, more particularly, to pneumatic tractor tires designed for use on the drive axles of farm tractors and similar vehicles.

To enable tractors to pull plows and other like farming implements through the ground, it is necessary to provide tires on the tractor drive axle which develop sufficient traction in the soil under the encountered load conditions. Typically, this property is sought to be satisfied by a tire tread design and construction providing on the tread generally transverse, discrete lugs which are capable of biting into the soil on which the tractor is operated for most farming uses. A variety of such lug tread designs have been utilized or proposed in the art for purpose of increasing traction through improved biting capability and effective expulsion of earth from the deep recesses between the lugs of the tread. Such designs also are required to take into account the wear characteristics of the tread lugs.

The utilization of lugs raised substantially above the base tread surface so as to improve the traction of tractor tires in generally encountered soil conditions is known to introduce tire and vehicle vibrations which affect ride comfort and stability of the tractor, and stress the drive axle. Vibration of this type is most noticeable when the tractor is driven on hard soil or paved surfaces as it occasionally must be, particularly at speeds above, say, ten miles per hour, but also can be encountered in normal operations in the generally soft soil for which the tires are designed. Often, designers and manufacturers of pneumatic tractor tires face a compromise situation between traction capability on the one hand and minimized vibration/maximized stability on the other. See, for example, U.S. Pat. Nos. 4,383,567 to Crum, et al.; 4,480,672 to Marshall, et al.; and 4,534,392 to Bonko, et al.

SUMMARY OF THE INVENTION

It is an object of the present invention to provide a pneumatic tractor tire exhibiting improved traction characteristics in generally encountered conditions of farm use.

Another object of the invention is to provide a pneumatic tire for tractors which exhibits improved traction characteristics as well as reduced vibrational characteristics in generally encountered conditions of use, as well as reduced vibration and improved stability on hard dirt or paved roads.

These and other objects are achieved by provision of a pneumatic tractor tire having a tread portion surrounding a reinforcing carcass, wherein the tread portion is comprised of two sets of long (or extended) lugs and two sets of short lugs spaced about the periphery of the tire, one set of long and one set of short lugs emanating from one shoulder area of the tread (lateral tread edge) and extending axially inward toward the circumferential center line of the tread, and one set of long and one set of short lugs emanating from the opposite shoulder area of the tread and also extending axially inward toward the circumferential tread center line. The lugs of each set of long lugs are identical except for being opposite in hand, as is the case for the short lugs. For the lugs emanating from a given tread edge, long lugs and short lugs alternate about the periphery of the tire and are spaced apart to provide void space or recesses therebetween. The same is the case for the long and short lugs emanating from the opposite tread edge, with the proviso that, for any given section across the tread width, long lugs are substantially directly opposite short lugs and vice-versa. Each long lug emanating from any given tread edge is of a length such that at least a portion of the lug extends a slight distance beyond the circumferential tread centerline, while the length of short lugs is such that they terminate a predefined distance short of the centerline. Each lug is smoothly curved from its emanating point at the tread edge to its axially inward terminating point short of or beyond the center line as the case may be.

More detailed features of the invention and the advantages achieved thereby are more easily explained and understood with reference to the drawings and detailed description which follows.

DETAILED DESCRIPTION OF THE INVENTION

Figures 1, 2:
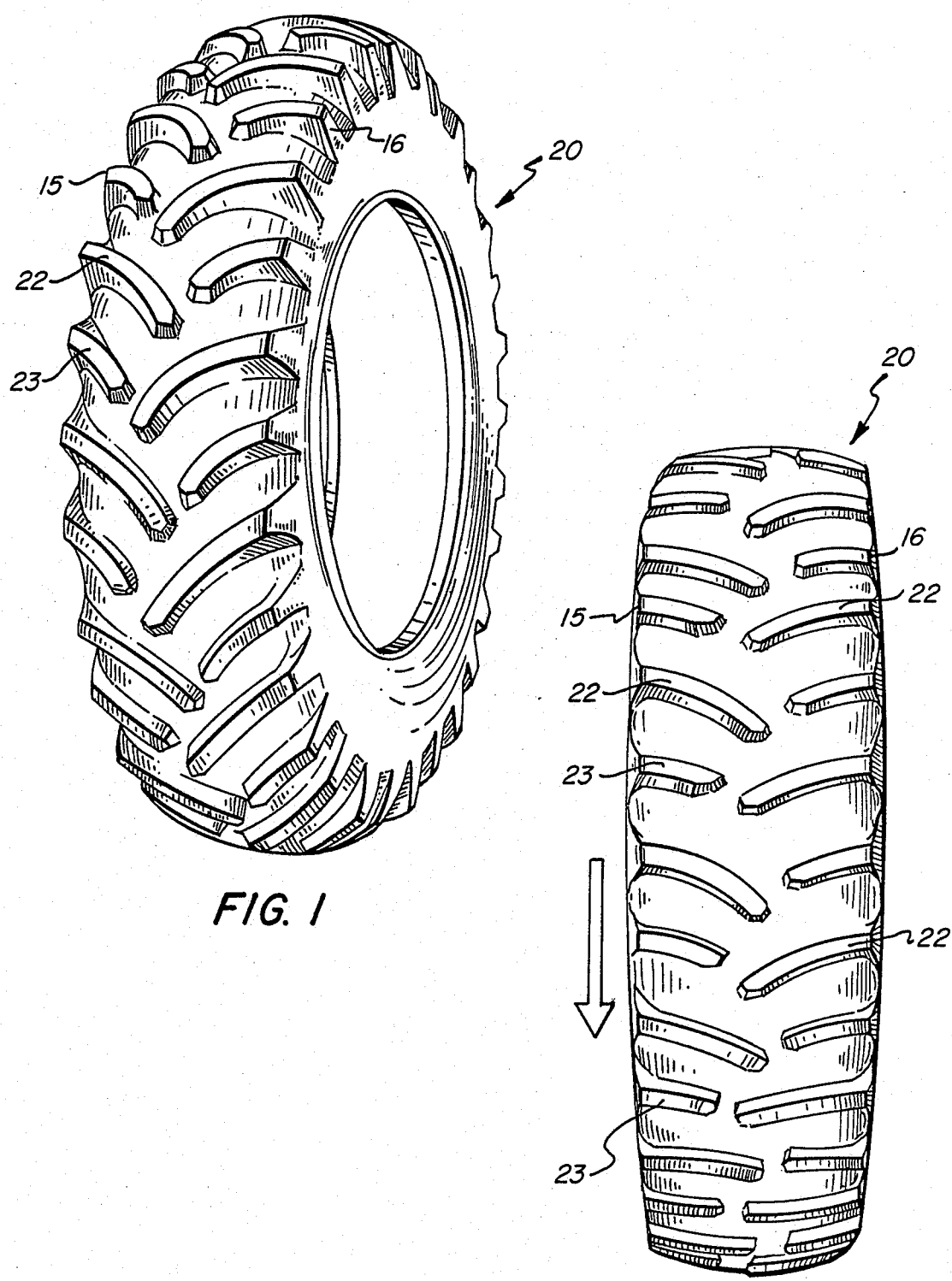
FIG. 1 is a perspective view of a tire constructed in accordance with the invention.
FIG. 2 is a front elevation view of the tire of FIG. 1.

As illustrated in the figures, tractor tire 20 consists of a tread portion 10 overlying a reinforcing carcass 11. The carcass consists of one or more plies of reinforcing material (e.g., filaments, textile) extending about the tire and anchored around a pair of generally inextensible annular beads 12 and 12'. As is well known in the art, the carcass reinforcement structure 11 can be either of the radial or bias ply type. The tread portion 10 may also be reinforced by belts (not shown) which extend circumferentially around the tire between the tread 10 and carcass 11. Sidewalls 14 and 14' extend from tread portion 10 radially inward to beads 12 and 12'.

Tread portion 10 comprises opposed shoulder portions or tread edges 15 and 16 from which emanate lugs (22, 23) with valleys or recesses between the lugs. A centerline 18 exists which extends about the circumference of the tread surface midway between the tread edges 15 and 16. Where reference is made herein to the "axial inward" direction or "axially inward", what is meant is an axial direction going from a given tread edge toward the centerline.

Figure 3:
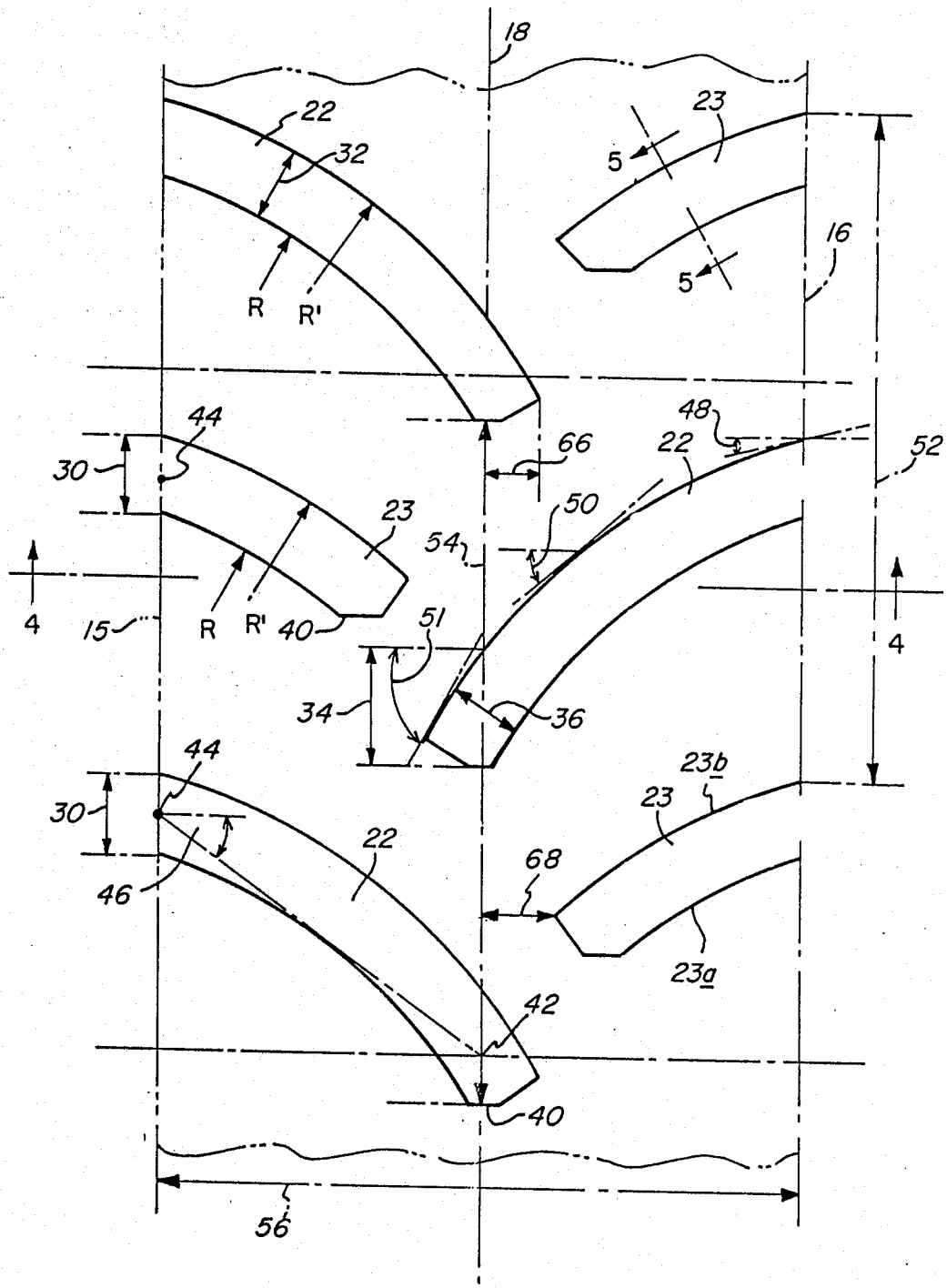
FIG. 3 is a plan view of a section of the tread of the tire of FIGS. 1 and 2.
Figure 4:
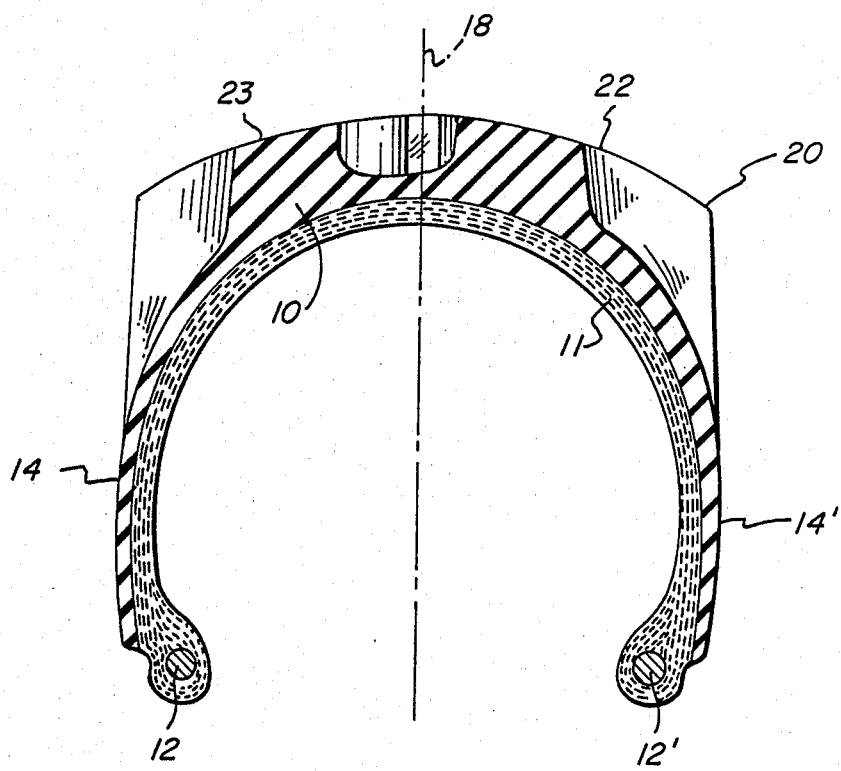
FIG. 4 is a cross-sectional view of a tractor tire constructed in accordance with the invention, taken substantially across the line 4—4 of FIG. 3.

As is shown in detail in FIG. 3 and in perspective in FIGS. 1 and 2, tread portion 10 consists of opposed lateral tread edges or shoulders 15 and 16. From each such edge, alternating long lugs 22 and short lugs 23 extend axially inward. The alternation of short and long lugs extending from lateral edge 16, and that of short and long lugs emanating from lateral edge 15, is such that, across the width of the tread, a short lug is generally opposite a long lug and vice-versa. Stated in other terms, an emanation point or area of a short lug from a given tread edge is substantially directly opposite an emanation point or area for a long lug from the opposite tread edge, and preferably the emanation points or areas are directly opposite.

The number of lugs disposed about the tread periphery for a given tire may vary within certain limits designed to provide sufficient lugs for traction purposes and yet sufficient void space to facilitate soil removal, together with optimized ride characteristics (i.e., minimized vibration, maximized stability). Generally, the tires will be constructed such that the "pitches" per tire consist of a whole number from 10 to 17. As used herein, a pitch is that portion about the circumference of the tire which includes one entire long lug and one entire short lug (emanating from a given tread edge) and which proceeds from the trailing edge of either a short or long lug to the trailing edge of the next similar lug emanating from the same tread edge. The pitch length is the length of the pitch. As will be appreciated, the length of a pitch measured along the tread edge (e.g., distance 52 in FIG. 3) will be less than that of a pitch measured along the center line (e.g., distance 54 in FIG. 3). The terms "shoulder pitch length" and "centerline pitch length" when used herein to define other parameters have reference to the foregoing. For each pitch measured along the shoulder, the pitch length is the same; for each pitch measured along the centerline, the pitch length is the same.

The tread design shown in FIGS. 1, 2 and 3 is of the uni-directional type, i.e., it is designed for a tire rotating in the direction shown by the arrow. Where reference is made herein to a "leading" edge of a lug, what is meant is that portion of the lug which contacts the ground first, whereas the "trailing" edge of a lug is that portion which contacts the ground last. Thus, for short lug 23 as shown in FIG. 3, the leading edge is 23a and the trailing edge is 23b.

Each of short lugs 23 and long lugs 22 is smoothly curved in shape along its length from its emanation point on the lateral tread edge 15 and 16 axially inward to its termination point short of or just beyond the centerline 18, the direction of curvature being in the direction of the intended tire rotation.

In defining the widths, lengths and curvature of short lugs 23 and long lugs 22, the following relationships exists. At the emanating point for each lug at the tread edge 15 or 16, the lug width for each (i.e., distance from trailing edge to leading edge measured along the tread edge as shown, e.g, as distance 30 in FIG. 3) is generally equal, and about 10 to 13% of the shoulder pitch length, preferably 11 to 12% of the shoulder pitch length. This lug width tapers very gradually as the lug progresses axially inward toward the centerline. In particular, the width of long lugs 22 as they cross the centerline, measured perpendicularly from trailing edge to leading edge (e.g., distance 36 as shown in FIG. 3), is generally about 80 to 99%, preferably 88 to 90%, of the lug width at the emanating point on the tread edge. At any given distance axially outward from centerline to a tread edge, the width of a short lug and long lug is substantially the same, such width being measured perpendicularly from leading edge to trailing edge (e.g., distance 32 as shown in FIG. 3).

As previously noted, long lugs 22 extend axially inward a short distance beyond the centerline 18. As shown in FIG. 3, the degree of extension beyond the centerline (distance 66) is measured with reference to a line, parallel to the centerline, intersecting the termination point of the trailing edge of the long lug. The distance between this parallel line and the centerline should be from about 5 to 9%, preferably 6 to 8%, of the arc width (i.e., length across tread from one tread edge to the other as shown by distance 56 in FIG. 3).

In contrast, the short lugs 23 terminate short of the centerline. Again with reference to a line parallel to the centerline and intersecting the terminating point of the trailing edge of the short lug, the distance between this parallel line and the centerline (e.g., distance 68) is from about 10 to 12% of the arc width.

Due to the axially inward curvature of long lugs 22 in the direction of tire rotation, the long lug occupies an area at the centerline greater than the perpendicularly measured lug width. Thus, the length of the centerline which passes through a long lug 22 (e.g., length 34 as shown in FIG. 3) is from about 14 to 17%, preferably 15 to 16%, of the centerline pitch length.

Figure 5:
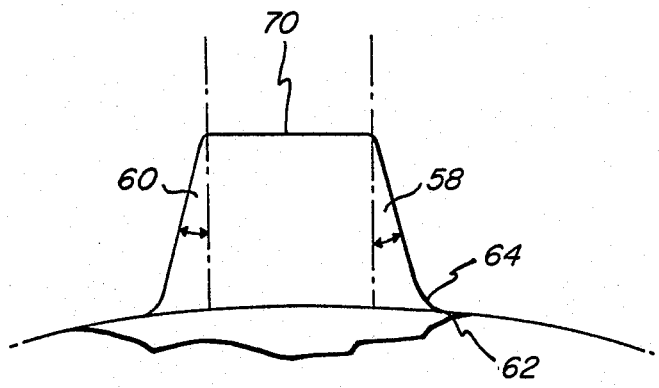
FIG. 5 is a cross-sectional view of a lug, taken substantially across the line 5—5 of FIG. 3.

As is most easily seen in FIG. 5, the walls of the short and long lugs are tapered outwardly from the top (most radially outward) surface 70 of the lug to the radially inward tread base 62. Measured at any point along the lug length with reference to a line perpendicular to the tread base and passing through the intersection of the side wall of the lug and the top surface 70 of the lug, the degree of outward taper of the walls of both leading edge and trailing edge (e.g., the angles 58 and 60 in FIG. 5) is on the order of about 10° to 25°. The degree of taper for leading and trailing lug walls may be the same but preferably is different. If different, it is preferred that the larger taper be for the trailing wall and that the difference between the tapers of the leading and trailing walls be no greater than about 10°, preferably no greater than 5°. As is generally conventional in lug design, the lug walls do not abruptly meet the tread base but rather are properly radiused so as to be smoothly blended into the base, as shown at point 64 in FIG. 5.

Along the tread edge 15 or 16 and about the circumferential periphery of the tire, and emanating points for each alternating short and long lug are substantially equally spaced apart (as measured, e.g., from midpoint 44 to midpoint 44 along the tread edge, or from trailing edge of one lug to trailing edge of the next lug, etc.). The spacing is determined by the number of pitches per tire and the pitch length, and is designed to provide void space or recesses between each lug at the tread edges and at all points axially inward therefrom.

Essential to the present invention is the smooth curvature of the lugs from their emanating point at the tread edge axially inward, and in the direction of tire rotation, toward the centerline (and across the centerline for long lugs). For any given designed arc (tread) width 56, the curvature of all lugs is substantially identical. Thus, for a tire of a given arc width, the curvature of the trailing edge of each lug is defined by substantially the same radius of curvature (R') and the curvature of the leading edge of each lug similarly is defined by substantially the same radius of curvature (R), R' being greater than R. Generally, the radius of curvature of the leading edge R is from about 70 to 115% of the arc width, preferably from about 72 to 112% thereof, while the radius of curvature of the trailing edge R' is generally from about 80 to 120% of the arc width, and preferably from about 84 to 118% thereof. The difference between R and R' generally is from about 6 to 16% of the arc width, and generally increases in this range with decreasing arc width.

In further definition of the curvature of the lugs, and with particular reference to long lugs 22, a straight line drawn from the midpoint 44 of the long lug along the tread edge to the midpoint 42 of the long lug where it crosses the centerline forms at the lug midpoint along the tread edge an angle (angle 46) of approximately 34° to 36°, most preferably about 35°, with reference to a line perpendicular to the tread edge and centerline and passing through the long lug midpoint at the tread edge. The same angular relationship generally exists for the short lugs 23 if they were extended to intersect the centerline, i.e., the short lugs are merely truncated versions of long lugs. In addition, it will be seen that the curvature of the lugs results in increasingly greater angular relationships existing axially inward along the length of the lug relative to a line perpendicular to the centerline. Thus, at any point along the length of the trailing edge of a lug, the angle formed by a line tangent to that point and a line perpendicular to the centerline at that point increases axially inward. As shown in FIG. 3, this angle at the tread edge (angle 48) will be, e.g., from about 12° to 19°, preferably 13° to 17°. At the point midway along the length of the trailing edge of the long lug (angle 50), the angle is generally from about 35° to 39°, preferably about 36° to 38°. At the axially innermost point of the trailing edge of a long lug, the angle (angle 51) is generally from about 50° to 60°, preferably about 55° to 58°.

As shown in FIG. 3, the termination areas for each lug preferably are shaped so as to remove the otherwise pointed contour from the leading edges or areas. Most preferably, the design is such that at least part of the termination portion of each lug is a surface 40 perpendicular to the centerline.

Tractor tires designed and manufactured according to the present invention combine the desirable features of traction and reduced vibration. With respect to traction, the smooth curvature of the lugs toward the centerline and the fairly substantial length of the short lugs provides excellent tractive pulling power. Moreover, this curvature, the even distribution of lugs, and the void area between lugs provides excellent cleanability for improved traction. At the same time, reduced vibration is achieved without loss of tractive power due to the symmetry of lugs (i.e., long bars substantially directly opposite short bars), the curvature of the lugs, and the substantial area occupied by the long lugs at the centerline, providing a smooth transition between lugs as the tire rides down the ground surface without transitional thumping as the lugs roll through the footprint. Lug symmetry further reduces side to side rocking and the associated lateral vibration. Finally, the tires of the present invention display excellent wear characteristics by reason of the fairly substantial length of the short lugs, the curvature of the lugs toward the centerline and the tapering of the lugs from top surface to tread base.

Thus, in accordance with the present invention, the tread of a pneumatic tractor tire is provided about its circumferential periphery with spaced apart lugs which are upstanding from the tread base (i.e., extending radially outward thereof) and spaced apart to provide recesses or voids between the lugs. The non-skid depth is generally chosen to be in conformance with the standards of the Tire and Rim Association. The lugs preferably are designed to be tapered inward from treat base to top lug surface so as to be generally trapezoidal in cross-section.

Substantial symmetry is provided to enable attainment of excellent tractive ability while at the same time attaining minimized vibration. According to the preferred embodiment of the invention, for any given tire size, each lug is of substantially the same width along the lateral tread edge, substantially the same cross-sectional width at any given axially outward point from the centerline, and substantially the same curvature, differing only in axially inward length. Additional symmetry is provided by reason of long lugs being substantially directly opposite short lugs and vice-versa.

The tire according to the present invention provides substantial recessed or void area between or among lugs yet provides sufficient lug surface for improved traction, wearability and reduced lug-to-lug transitional thumping and vibration as the tire moves through its footprint.

As is commonplace in the industry, the various length, angles and relationships set forth herein have reference to the molded dimensions of the tire. Generally speaking, these tread dimensions and relationships also will identically exist when the tire is mounted on its proper rim and inflated to its design pressure.

While certain embodiments have been set forth for purposes of illustrating the invention, it will be appreciated by those skilled in the art that a variety of modifications and alterations can be made without departing from the spirit and scope of the invention, as defined by the appended claims.

What is claimed is:

1. A pneumatic tire for tractors and like vehicles comprising a ground surface-engaging tread portion surrounding a reinforcing carcass, said tread portion comprising:
    (a) a first set of long lugs and a first set of short lugs alternately disposed about the circumferential periphery of the tread, each lug of said first set of long and short lugs emanating from the same lateral edge of said tread and extending axially inward therefrom, the spacing of said alternately disposed lugs about said circumferential periphery of the tread being such that void space exists in the tread between each alternating lug, the emanation point of each long or short lug along the lateral tread edge being substantially equally spaced apart along said lateral edge from the emanation point of the next alternating lug;
    (b) a second set of long lugs and a second set of short lugs being identical to said first set of long lugs and said first set of short lugs but opposite in hand, alternately disposed about the circumferential periphery of the tread and emanating from the other lateral edge of said tread and extending axially inward therefrom, the alternating circumferential disposition of said second set of long lugs and said second set of short lugs being offset relative to the disposition of said first set of long lugs and said first set of short lugs such that, across the tread width, an emanating point for a short lug along one lateral tread edge is substantially directly opposite an emanating point for a long lug along the other lateral tread edge; wherein (i) each said lug has a leading edge and a trailing edge (ii) each said lug is smoothly curved along its length from its emanating point at a tread edge to its terminating point axially inward thereof, the direction of axially inward curvature being in the direction of intended tire rotation; (iii) the radius of curvature from the leading edge of each long lug and the leading edge of each short lug are substantially the same, the radius of curvature of the trailing edge of each long lug and the trailing edge of each short lug are substantially the same, and the radius of curvature of said trailing edge is greater than that of said leading edge; (iv) each said long lug terminates axially inward a short distance across the tread centerline and each said short lug terminates axially inward a short distance before said centerline; and (v) for a point along the length of the trailing edge of said lugs, the curvature angle formed between a line tangent to said point and a line, through said point, perpendicular to the centerline, increases as said point progresses axially inward.

2. The pneumatic tire according to claim 1 wherein the terminating point for each said long lug, with reference to the distance between the centerline and a line parallel thereto intersecting the terminating point of said trailing edge of the long lug is from about 5% to about 9% of the tread arc width, and wherein the terminating point for each said short lug, with reference to the distance between the centerline and a line parallel thereto intersecting the terminating point of said trailing edge of the short lug is from about 10% to about 12% of the tread arc width.

3. The pneumatic tire according to claim 1 wherein the width of each said lug, measured perpendicularly across the leading and trailing edges thereof, diminishes gradually axially inward along the length of the lug.

4. The pneumatic tire according to claim 1 wherein the width of said long lugs at the point where they cross the centerline, and measured perpendicularly from trailing edge to leading edge, is from about 80% to about 99% of the distance between their trailing edge and leading edge at the lateral tread edge.

5. The pneumatic tire according to claim 1 wherein the distance between the trailing edge and leading edge of each said lug at the lateral tread edge is from about 10% to about 13% of the shoulder pitch length.

6. The pneumatic tire according to claim 1 wherein the distance along the centerline occupied by said long lugs as they cross said centerline is from about 14% to about 17% of the centerline pitch length.

7. The pneumatic tire according to claim 1 wherein the radius of curvature for the leading edge of each long lug and the leading edge of each short lug is from about 70% to about 115% of the tread arc width; and wherein the radius of curvature for the trailing edge of each long lug and the trailing edge of each short lug is from about 80% to about 120% of the tread arc width; and wherein the radius of curvature of said trailing edge is greater than that of said leading edge in an amount from about 6% to about 16% of the tread arc width.

8. The pneumatic tire according to claim 7 wherein the angle formed between a first line perpendicular to the centerline passing through the midpoint of each said lug at the lateral tread edge and a second line between said midpoint and the midpoint of each lug where it actually does, or by extension would, cross the centerline is from about 34° to about 36°.

9. The pneumatic tire according to claim 1 wherein said curvature angle is from about 12° to 19° for the point of said trailing edge at the tread edge; from about the length 39° for the point of said trailing edge midway along the length of a long lug; and from about 50° to 60° at the axially innermost point of the trailing edge of the long lug.

10. The pneumatic tire according to claim 1 wherein the upstanding walls forming the leading edge and trailing edge of each said lug taper outwardly from the top surface of the lug to the tread base.

11. The pneumatic tire according to claim 10 wherein the degree of outward taper for each such wall is from about 10° to about 25°.

12. The pneumatic tire according to claim 11 wherein the degree of outward taper for the walls forming the leading edge of said lugs and the walls forming the trailing edge of said lugs are substantially equal.

13. The pneumatic tire according to claim 11 wherein the degree of outward taper of the walls forming the trailing edge of said lugs is larger than that for the walls forming the leading edge of said lugs, and wherein the difference between said degrees of outward taper is no greater than about 10°.

14. The pneumatic tire according to claim 1 wherein the width of a long lug, measured perpendicularly across the leading and trailing edges thereof, at a given axially outward distance from the centerline, is substantially the same as the width of a short lug at the same said axially outward distance from the centerline.

* * * * *

UNITED STATES PATENT AND TRADEMARK OFFICE
CERTIFICATE OF CORRECTION

PATENT NO. : 4,791,971
DATED : December 20, 1988
INVENTOR(S) : Betty J. Wells

It is certified that error appears in the above-identified patent and that said Letters Patent is hereby corrected as shown below:

Title Page, Item [19], "Shinn" should read --Wells--.
Title Page, "Inventor: Betty J. Shinn"

should read -- Inventor: Betty J. Wells --

Col. 8, line 17, delete "the length"

and insert -- 35° to --

Signed and Sealed this

Sixteenth Day of May, 1989

*Attest:*

DONALD J. QUIGG

*Attesting Officer*  *Commissioner of Patents and Trademarks*